United States Patent [19]

Kryder et al.

[11] Patent Number: 4,882,718
[45] Date of Patent: Nov. 21, 1989

[54] SINGLE-HEAD, DIRECT OVERWRITE MAGNETO-OPTIC SYSTEM AND METHOD

[75] Inventors: Mark H. Kryder; Han-Ping D. Shieh, both of Pittsburgh, Pa.

[73] Assignee: Movid Information Technology, Inc., Schenectady, N.Y.

[21] Appl. No.: 154,240

[22] Filed: Feb. 10, 1988

Related U.S. Application Data

[63] Continuation-in-part of Ser. No. 33,931, Apr. 3, 1987, abandoned, which is a continuation of Ser. No. 837,130, Mar. 7, 1986, Pat. No. 4,679,180.

[51] Int. Cl.$^4$ .................. G11B 11/12; G11B 13/04
[52] U.S. Cl. ................................. 369/13; 365/122
[58] Field of Search .................. 369/13, 100, 116; 360/59, 57, 114; 365/122, 10, 22

[56] References Cited

U.S. PATENT DOCUMENTS

| | | | |
|---|---|---|---|
| 3,949,387 | 4/1976 | Chaudhari et al. | 360/59 |
| 4,649,519 | 3/1987 | Sun et al. | 365/122 |
| 4,701,881 | 10/1987 | Tanaka et al. | 365/122 |
| 4,771,347 | 9/1988 | Horimai et al. | 360/59 |
| 4,787,077 | 11/1988 | Barton et al. | 369/100 |
| 4,794,560 | 12/1988 | Belt et al. | 369/13 |

OTHER PUBLICATIONS

Braat et al., "High Density Magneto-Optical Recording", Proceedings of SPIE-The Inter. Society for Optical Engineering, vol. 420, pp. 206–213, 6/(6–10)/1983.

Primary Examiner—Alan Faber
Assistant Examiner—Hoa T. Nguyen
Attorney, Agent, or Firm—Morgan & Finnegan

[57] ABSTRACT

A magneto-optic information storage system is disclosed suitable for compensation point recording in the absence of an external bias field. The pulse of light used to erase imparts less energy than the pulse used to write. Also disclosed is a method for directly overwriting data recorded on a magneto-optic medium by applying lower energy erasing pulses of light and higher energy writing pulses.

22 Claims, 3 Drawing Sheets

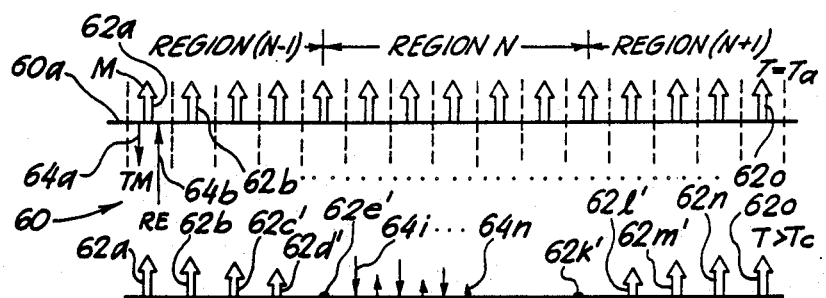
FIG. 2a
FIG. 2b
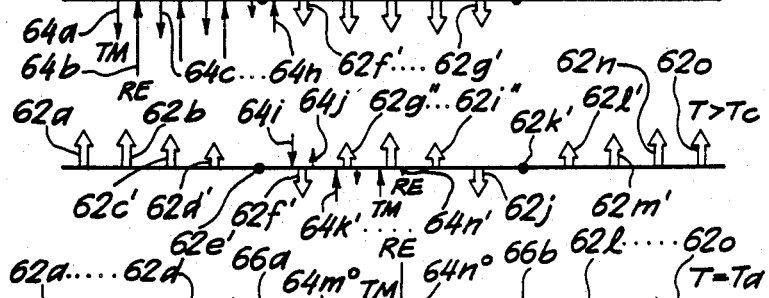
FIG. 2c
FIG. 2d
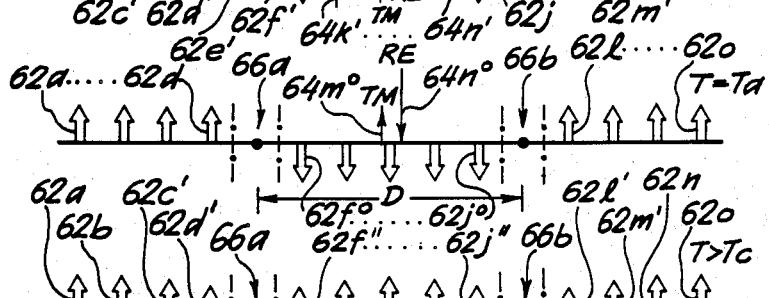
FIG. 2e
FIG. 2f
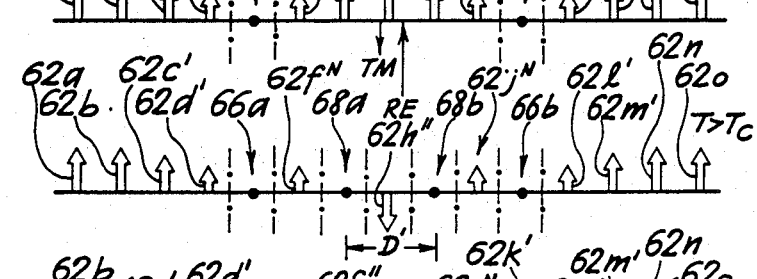
FIG. 2g
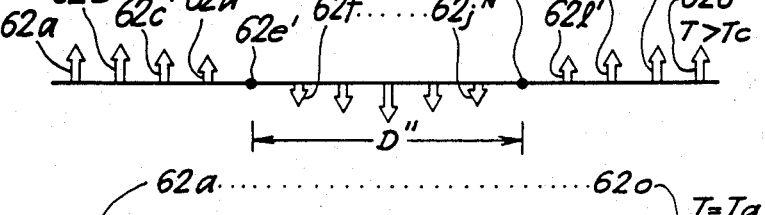
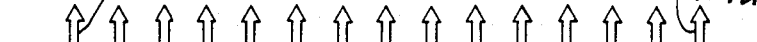
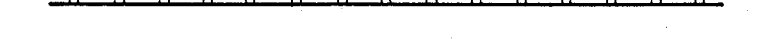
FIG. 2h

SINGLE-HEAD, DIRECT OVERWRITE MAGNETO-OPTIC SYSTEM AND METHOD

RELATED APPLICATIONS

This application is a continuation-in-part of application Ser. No. 033,931, (now abandoned and is the parent application of pending application Ser. No. 279,255), filed Apr. 3, 1987, which in turn is a continuation of application Ser. No. 837,130, filed Mar. 7, 1986, (now U.S. Pat. No. 4,679,180).

The present invention relates to magneto-optic data storage and, more particularly, to magneto-optic compensation point recording and erasing without external magnetic bias.

BACKGROUND OF THE INVENTION

Thin film, ferrimagnetic materials such as rare earth-transition metal amorphous alloys of terbium iron cobalt (TbFeCo), gadolinium terbium cobalt (GdTbCo) and gadolinium terbium iron cobalt (GdTbFeCo) have been known as high-density, magneto-optic recording media. Magnetic domains on the order of one micrometer in size can be recorded in the magneto-optic film. These ferrimagnetic materials have high coercivity at room temperature and low coercivity at high temperatures. The recording medium, preferably in a coated disk form, can be magnetized in a particular direction perpendicular to the surface by heating the disk in the presence of an external magnetic field, and thin permitting the disk to cool or by applying a saturating magnetic field. Data can thereafter be stored on the disk by heating a small spot (preferably by laser energy) in the presence of an external magnetic field of the desired magnetic polarity. The heated area is magnetized in the direction of the external magnetic field when the area cools and returns to the high coercivity state at room temperature. Data on the disk is "read" by noting the effect on polarized light reflected off the disk surface. Such systems operating with external magnetic bias operate by either heating above the compensation temperature of the medium or by heating above the Curie temperature of the medium. Systems using a reversible external magnetic field have the advantage of directly controlling the recorded magnetic state according to the polarity of the applied external field, but tend to be slow in operation.

Curie point systems operating without external magnetic bias are also known. See Japanese patent application No. 59/1984-113506 "Method and Apparatus for Opto-Magnetic Recording, Reading and Erasure", filed Dec. 21, 1982, published June 30, 1984, and identifying M. Okada et al as inventors. The magneto-optic medium in this system has a relatively low Curie point, in the range of 80° C. to 180° C. Where an area is heated above the Curie temperature, the heated area loses its magnetization and, upon cooling, forms a stable domain of reverse magnetic polarity at approximately one-half the radius of the area heated above the Curie point. To erase a previously recorded domain, the previously recorded domain area is heated above the Curie point and the magnetization of the heated area disappears. If the erase pulse is small and just sufficient to heat the area of the prior domain above the Curie point, the domain of reverse magnetic polarity that tends to form upon cooling is unstable and therefore collapses during cooling.

With the Curie point system described by Okada et al, recording and erasing are achieved by a single-beam, direct over-write operation. The laser pulse used to record a spot domain is greater than the laser pulse required to erase that domain. Therefore, a large record pulse creates a domain indicating a "1" state regardless of prior magnetic history and, likewise, a smaller erase pulse results in the absence of a domain indicating a "0" state regardless of prior magnetic history. In both cases, the area heated above the Curie point loses its magnetism thereby wiping out the prior magnetic history. The existence of a domain, or lack thereof, when the area cools depends on the size of the area heated above the Curie point.

SUMMARY OF THE INVENTION

In parent applications Ser. Nos. 033,931 and 837,130, the inventors hereof describe their discovery of biasless compensation point operation. By using a ferrimagnetic recording medium with a compensation point between 40° C. and 140° C. and a high Curie point it is possible to record and erase without using external magnetic bias by heating selected areas above the compensation point and below the Curie point. If a laser pulse is applied to heat a large enough area above the compensation point, the coercivity is lowered and the self-demagnetizing field of the medium forms a domain of reverse magnetic polarity as the area cools. If a smaller pulse is thereafter applied to the same area, a domain is created within the prior domain which expands and draws in the surrounding domain wall until the walls annihilate one another.

Even though the mechanism for erasing is significantly different from that used in Curie point erasing, applicants have discovered that with compensation point operation the laser erase pulses are smaller than the record pulses. From this discovery it becomes obvious that single-beam direct overwrite operation is possible in a compensation point system, at least for single data spot operations.

A danger of domain growth exists in compensation point operations, however, where data is recorded on multiple passes in which successive "1"s are recorded without an intervening "0" (erase). The domain or data spot may grow due to slight misalignment on subsequent passes creating an enlarged domain that cannot be erased reliably. Also, there is a danger that successive erase pulses would have a cumulative effect and result in a recorded domain. Compensation point operation does not heat the area above the Curie point and therefore does not wipe out the prior magnetic history each time new data is recorded as is the case with Curie point operation. Applicants have discovered that if the recording medium is formulated to provide sufficient domain mobility and sufficient time elapses between successive record or erase operations, a domain will not grow upon application of subsequent record pulses, but instead will move, maintain the same size and realign on the last laser pulse. Also, under these conditions, erase pulses do not accumulate to form domains.

BRIEF DESCRIPTION OF THE DRAWINGS

FIGS. 2a–2h are graphical representations of net magnetic moments of several adjacent data bit storage regions, at times before, during and after two successive changes in stored value.

DETAILED DESCRIPTION OF THE PRESENTLY PREFERRED EMBODIMENTS

Figure 1:
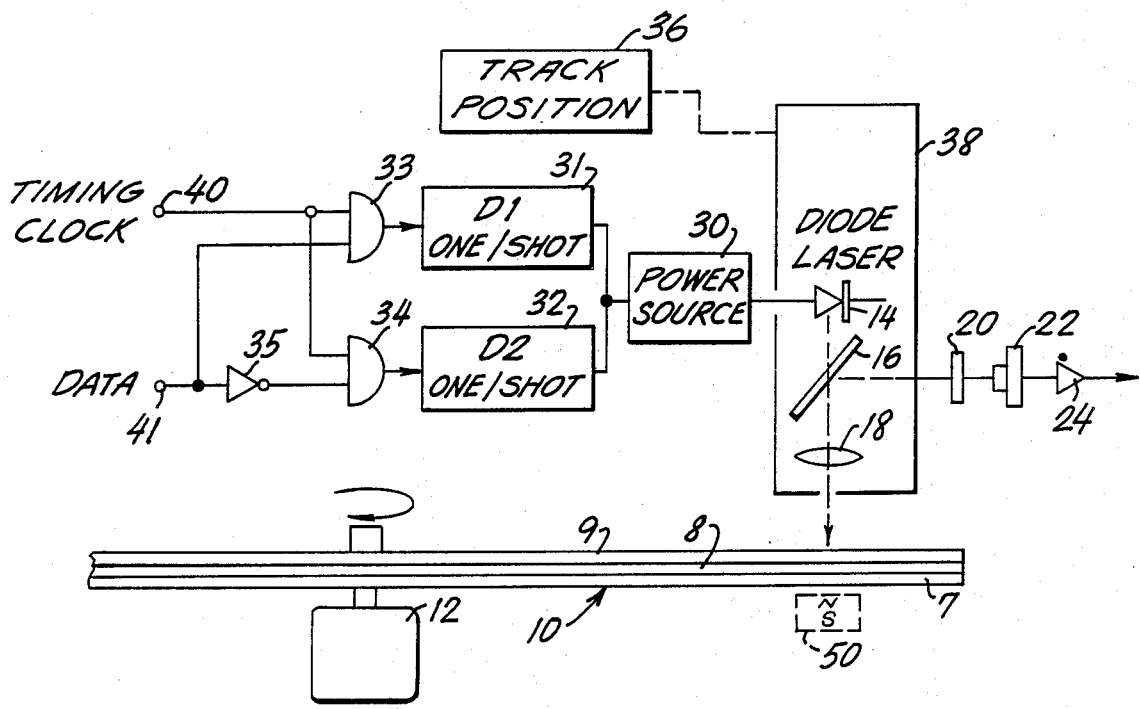
FIG. 1 is a diagram illustrating a magneto-optic recording disk and the apparatus to erase and over-write digital data recorded on the disk.

FIG. 1 is a schematic illustration of the compensation point magneto-optic data storage system for writing and erasing spot domains of reverse magnetic polarity. The magneto-optic recording medium is on the surface of a disk 10 which is rotated by a suitable drive motor 12. A laser source 14 provides a polarized beam of laser energy directed toward the disk surface passing through a half-silvered mirror 16 and a lens 18. Light reflected from the disk surface passes through lens 18, is reflected off mirror 16, and then passes through a polarizer 20 to a photo detector 22 which in turn supplies a signal to an amplifier 24 indicating the amount of light received. Laser 14 and lens 18 make up a head unit 38 which can be selectively positioned at different distances from the center of disk 10 corresponding to different recording tracks by means of a track positioning mechanism 36. Magnetic field producing means 50 is provided beneath disc 10. This magnetic field producing means is used to initially orient all the magnetic domains in a known direction, and is not used for magneto-optical recording and erasing.

Disk 10 includes a magneto-optic recording medium 8 placed on a substrate 7 by sputtering or like processes. The recording surface is overcoated with an optically-transparent protective layer 9 such as silicon oxide. Other suitable overcoat materials include silicon nitride, aluminum nitride, titanium oxide and zirconium oxide. The substrate is made of aluminum, glass (such as Corning glass types 0211 or 7059) or polycarbonate and glass substrates coated with photosensitive layers.

The recording layer is fabricated of a ferrimagnetic magneto-optic material, such as an alloy of gadolinium terbium cobalt (GdTbCo), gadolinium terbium iron cobalt (GdTbFeCo) and the like, which has a compensation temperature $T_c$ preferably higher than the highest expected ambient temperature $T_a$, but much less than the crystallization temperature of the alloy (about 250° C.). Compensation temperatures should be at least a few tens of degrees C. above the normal room temperature. Experimental work has established that magnetic domains in ferrimagnetic materials can be erased without magnetic bias according to the compensation point technique of this invention in materials with a compensation temperature in the range of 40° C. to 140° C. Erasure, although possible, does not work reliably outside this range. The preferred range of compensation temperatures is 60° C. to 100° C. The Curie temperature should be at least 150° C. and at least 50° C. above the compensation point and preferably at least 100° C. above the compensation point. In-plane hysteresis, which may be caused by oxidation, should be avoided.

In general it is known that the compensation temperature of a ferrimagnetic recording medium is a function of the ratio of the two types of magnetic materials. In rare earth, transition metal, magneto-optic formulations, the compensation temperature is a function of the rare earth to transition metal ratio. If more than one rare earth is included in the formulation, the compensation temperature is approximately independent of the ratio of the rare earths. In formulations including iron, such as gadolinium terbium iron cobalt (GdTbFeCo), the compensation temperature is approximately independent of the iron/cobalt (Fe/Co) ratio. In formulations in which cobalt is the transition metal, about 77% cobalt yields a compensation temperature of 50° C., whereas about 75.8% cobalt yields a compensation temperature of 100° C.

Good domain mobility is required in the recording medium so that, with multiple pass recording of a particular spot, the domain will realign and not grow. Ferrimagnetic alloys including light rare earths such as gadolinium usually provide good mobility but generally require an approximately equal proportion of a heavy rare earth like terbium to increase coercivity to an effective operating level.

A preferred formulation (in atomic %) tested in the laboratory is as follows:

$Gd_{13} Tb_{13} Fe_{59} Co_{15}$ having a compensation temperature of 90° C., a Curie temperature of 330° and a coercivity $H_c$ of 2.5 kilo-oersteds at 27° C.

Growth of a domain is likely to occur when successive areas overlap while heated above the compensation point. Successive erase pulses which overlap above the compensation temperature can create a new domain. It is essential therefore that the medium rapidly cool below the compensation point to avoid such overlap on successive operations or successive passes recording or erasing the same spot. Thin film coatings of the recording medium on the order of 100 nanometers normally cool to room temperature in considerably less time than required for multiple passes.

After fabrication, the disk is subjected to a saturating magnetic field of about 20 kilo-oersteds to provide an initial magnetic state.

As shown in FIG. 1, laser 14 is energized by a power source 30. For lower cost units operating at low to moderate disk speeds, semiconductor diode lasers, such as the SHARP LT 024MDD diode laser which operates at 782 mm wavelength and up to 20 milliwatts power, are preferred. Another suitable diode laser is HLP 1400 operating at 820 mm wavelength available from Hitachi. For systems requiring more power for operating at higher disk velocities, an argon gas laser can be used.

With a diode laser, energization for an interval of 10 nanoseconds to 1 microsecond with power levels on the order of 1–20 milliwatts is used to affect the magnetic state of the recording medium during "write" and "erase" operations, whereas a lower power level which does not alter the magnetic state of the medium is used for "read" operations. Nucleating micrometer size spot domains in a gadolinium terbium cobalt (GdTbCo) film, for example, can be achieved by locally heating the film with seven milliwatts of laser power for a 300 nanosecond pulse duration without an externally applied magnetic field. A spot domain written with a pulse of 300 nanoseconds duration can be completely erased by a succeeding pulse of 100–200 nanoseconds duration at the same power level. With 12 milliwatts of laser power, a spot domain written with a 100 nanosecond pulse can be erased by a 30–80 nanosecond pulse; a spot domain written with a 150 nanosecond pulse can be erased with a 35–130 nanosecond pulse; and a spot domain written with a 200 nanosecond pulse can be erased with a 45–175 nanosecond pulse. A one-shot multivibrator 31 is connected to power source 30 and set to produce a pulse of duration $D_1$ corresponding to the longer "write" pulse, and a one-shot multivibrator 32 is connected to power source 30 and set to produce a pulse of duration $D_2$ corresponding to the shorter "erase" pulse.

Lens 18 should be configured to focus the beam, at the half power diameter thereof, to an area having a diameter somewhat less than the diameter of the region to be heated. In both writing and erasing in accordance with this invention, the object in selecting the laser pulse power is to heat an area above the compensation point without significant heating above the Curie temperature. Thus, localized heating raises the temperature above the compensation point, and causes a localized decrease in the coercivity, of substantially only a limited region into which data is to be written.

The data written on a track of disk 10 can be non-destructively read therefrom by causing a reading light beam of linear-polarized light from laser 14, energized by a low level power source (not shown in FIG. 1) of amplitude insufficient to heat an area to a temperature high enough that the magnetization changes, to be projected toward the disk surface. In the reflected beam, polarization is rotated in a direction dependent upon the direction of the net magnetic moment. The polarization of the reflected beam can therefore be analyzed to determine the binary state of the data stored in the region being read.

The present invention facilitates spot domain recording and erasing of previously written information in selected regions of the magneto-optic medium. The method employs the self demagnetizing field created within a reheated region by the specially formulated thin film magneto-optic recording medium (with a compensation temperature in the range of 40° to 140° C. and a Curie point temperature at least 50° C. above the compensation temperature) to reverse the net magnetization of the region and thus eliminate the requirement for an externally applied bias magnetic field. The physical processes believed to be involved will be described hereinafter in conjunction with FIGS. 2a–2h. In general, when a sufficiently large region is heated above the compensation point to lower the coercivity of the region, the demagnetizing field creates a stable domain of reverse magnetic polarity when the region cools. To erase a previously recorded domain, a lower energy laser beam is used to create a domain within the prior domain. The new domain expands and draws in the surrounding domain wall until the domain walls annihilate one another, thereby erasing the domains.

Control circuits suitable for achieving direct over-write operation according to the invention are illustrated in FIG. 1. Timing clock pulses, such as are conventionally derived from a timing track on the disk, are applied to a terminal 40 whereas binary data to be recorded is supplied to a terminal 41. Data terminal 40 is directly connected to one input of an AND gate 33 and is connected to one input of an AND gate 34 via an inverter 35. Terminal 40 is connected to the other inputs of AND gates 33 and 34. The outputs of AND gates 33 and 34 are connected to one-shot circuits 31 and 32, respectively.

Figure 1A:
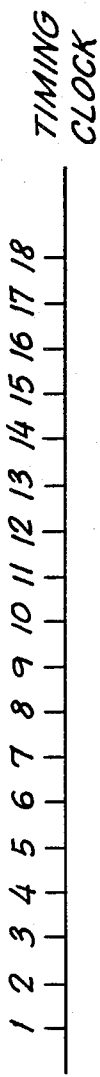
FIGS. 1a–1d are a series of illustrations showing the method of controlling the laser to achieve direct over-write according to the invention.
Figure 1B:
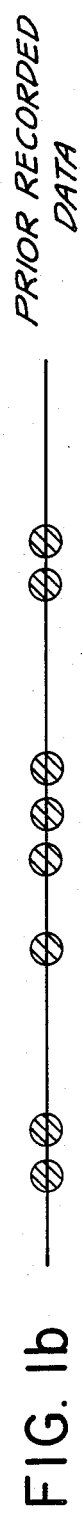
Figure 1C:
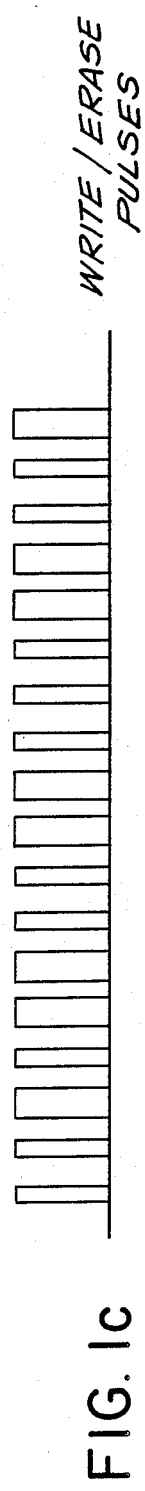
Figure 1D:

The direct over-write method of operation according to the invention is illustrated in FIGS. 1a–1d. A sequence of eighteen timing pulses is shown in FIG. 1a designating the positions of the data spot locations along a data track on the disk. Assume that data has previously been recorded as shown in FIG. 1b wherein domains of reverse magnetic polarity appear at locations 2, 3, 7, 9, 10, 11, 15 and 16. If on a subsequent pass, the laser is energized with the larger write pulse from one-shot 31 at locations 3, 5, 6, 9, 10, 14, 15 and 18, as shown in FIG. 1c, domains of reverse polarity are recorded as indicated by the shaded areas appear at corresponding locations on the track as shown in FIG. 1d. Short erase pulses from one-shot 32 at locations 1, 2, 4, 7, 8, 11, 12, 13, 16, and 17 erase any domains that may have previously been recorded at these locations.

As can be seen, application of a higher energy "write" pulse results in a domain of reverse magnetic polarity which can correspond to a "1" state regardless of the prior magnetic history at the data location. Likewise, application of a lower energy "erase" pulse results in a "0" state regardless of prior magnetic history. That is, any existing domain is erased and if no domain exists, none is formed. Thus, the data pattern can be directly controlled by a single beam pass according to the pattern of "write" and "erase" pulses.

With a recording media including gadolinium to provide domain mobility and terbium to increase coercivity (GdTbFeCo) and a film thickness on the order of 100 nanometers, re-recording a data spot 1000 times did not result in any noticeable growth of the domain. Also, multiple erase pulses do not result in a recorded domain with such a medium.

In some instances re-recording domains can lessen the contrast indicating some porosity in the domain. The problem can be eliminated by placing a small permanent magnet 50 (FIG. 1) beneath the film with the field in such a direction as to enhance the recording process without affecting the erase process without affecting the erase process (i.e. in opposition to the pre-magnetized state). Such use of a non-reversible magnetic field does not adversely affect the operating speed as would be the case with an external reversible field.

Laser pulses at different energy levels for the "write" and "erase" operations can be achieved using different power levels with the same pulse duration. With a GdTbFeCo medium, a domain written with an 800 nanosecond laser pulse at 8.3 milliwatts (0.5 micrometer domain size) can be erased with a laser pulse of the same duration at a power level of 2.6–7.3 milliwatts. A domain written with an 800 nanosecond pulse at 10.4 milliwatts (about 0.7 micrometer domain size) can be erased at a power level of 6.8–9.2 milliwatts at the same duration. A domain of a 1.0 micrometer size recorded using a 1000 nanosecond pulse at 7.9 milliwatts can be erased with a pulse at 2.4–6.9 milliwatts at the same duration. A domain of a 1.2 micrometer size can be recorded using a 1000 nanosecond pulse at 10.5 milliwatts and can be erased using pulses at 3.3–7.4 milliwatts at the same duration.

Figure 3:
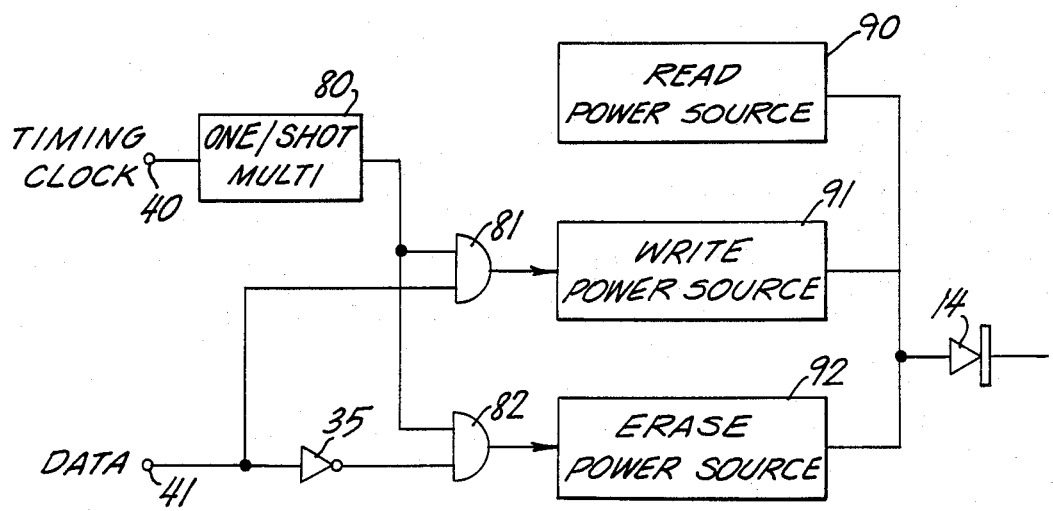
FIG. 3 is a diagram illustrating alternative apparatus to read, erase and over-write digital data recorded on the disk.

Alternative apparatus for achieving high energy "write" pulses and lower energy "erase" pulses is illustrated in FIG. 3, wherein the light pulses produced by laser 14 are of the same duration, but at a higher power level for "write" operations and at a medium power level for "erase" operations. The timing pulses at terminal 40 are supplied to a one-shot multivibrator 80 which in turn supplies pulses of controlled duration to AND gates 81 and 82. Data terminal 41 is directly connected to the other input of AND gate 81 and is connected to the other input of AND gate 82 via an inverter 35. The output of AND gate 81 activates a write power source 91 which in turn energizes diode laser 14 at the higher power level when activated. The output of AND gate 82 activates power source 92 which in turn energizes diode laser 14 at the medium power level when activated. A read power source 90 is connected to diode laser 14 to energize the laser at a power level below that which can affect the state of the magnetic recording medium.

Critical to the write operation according to the invention is to supply sufficient energy to heat an area above the compensation temperature large enough to reduce the coercivity, and create a domain of reverse magnetic polarity upon cooling. Critical to the erase operation according to the invention is to supply a moderate amount of energy sufficient to create a domain which can grow and annihilate any surrounding domains but not sufficient to create a stable domain upon cooling. The energy for the write and erase operations can be by means of laser pulses of the same power level at different pulse durations (FIG. 1) or by means of pulses of the same duration at different power levels (FIG. 3). The energy can also be supplied using multiple pulses sufficiently closely spaced to create overlapping areas heated above the compensation temperature.

The process that appears to be physically occurring for the self-inverting data over-write method (using the apparent self-demagnetizing field of the thin-film magneto-optic recording media) is illustrated in FIGS. 2a-2h. Prior to the time at which a first over-write operation is to occur, the media layer 60 is at an ambient temperature Ta less than the compensation temperature Tc of the magneto-optic material. The recording regions each contain one bit of a first set of data. FIG. 2a illustrates that, for the starting data set with the same data value, e.g., a binary one state, in each of three sequential regions (N−1), N, and (N+1), the net magnetic moments (symbolized by the broad arrows 62a-62o) are all directed in the same (e.g., upward) direction substantially perpendicular to the media layer surface 60a and are all of approximately the same amplitude. The amplitude and direction of the net magnetic moment M is established by the relative amplitudes and direction of the magnetic moment of the individual components of the magneto-optic alloy. Here, the downwardly-directed moment 64a of the transition metal (TM) component of the alloy is of smaller amplitude than the upwardly-directed moment 64b of the rare earth (RE) alloy component, in each subregion.

As a region N receives energy from the overwriting means (laser 18), the temperature of that region is raised until the compensation temperature Tc is exceeded. Because the impingent light beam 15 has a substantially Gaussian energy distribution, the entire region N is not uniformly heated. Thus, while the individual alloy component magnetic moments (e.g., moments 62a and 62b) and the net magnetic moments (e.g., net moments 62a, 62b, 62n and 62o) all remain substantially unchanged in subregions removed from the region N receiving energy, those subregions nearer to the heated region N receive energy from the fringes of the beam. Responsive to the increased temperature, which is less than the compensation temperature in these other regions (N−1), (N+1), etc., the magnetic moment 64c of the transition metal TM component is decreased by some amount, which is not as great as the decrease in the magnetic moment 64d of the rare earth RE component; the net moment (e.g., net moments 65c' and 64m') of that subregion is reduced. As the temperature increases, the reduction in the magnitude of the net magnetic moment (e.g., net moments 64d' and 64l') continues, responsive to the faster reduction of the RE moment 64f than the reduction in the TM moment 64e, with closer location to region N. In some subregions the compensation temperature is just attained and the reduced amplitudes of the TM and RE moments 64g and 64h become by definition, equal; the net magnetic moment 62e', 62k', . . are of zero magnitude (and define the periphery of the region N). Inward of the regions 62 with zero net magnetic moment, the subregion temperature exceeds the compensation temperature; the reduced amplitude of the TM moment (e.g., magnetic moments 64i, 64k, 64m . . . ) is now larger than the reduced amplitude of the RE moment (e.g., magnetic moments 64j, 64l, 64m, 62f-62j', . . . ) are all now reversed, having increasing magnitude but in the opposite direction (e.g., into the recording layer).

The self-demagnetizing field in opposition to the magnetization in the center region of FIG. 2b causes the component moment directions to reverse as shown in FIG. 2c. The component moments in subregions within, but adjacent to, the region N periphery remain fixed in the former direction (e.g., as shown by moments 64i and 64j) so that the net moment remains fixed in the new (now inverted) direction. The component moments in the more central subregions, however, are direction reversed to the original direction (e.g., the upward direction, as at net magnetic moments 62g'', 62h'', 62i'', . . . ). As the subregion temperature decreases upon cooling, after removal/off-switching of the light beam, the amplitudes of the alloy component magnetic moments increase to their ambient temperature values; as each subregion passes through the compensation temperature, the net magnetic moment 62 thereof is decreased to zero. As shown in FIG. 2d, in each subregion, at some temperature less than the compensation temperature, the RE magnetic moment (e.g., magnetic moment 64n°) amplitude is again greater than the amplitude of the TM magnetic moment (e.g., magnetic moment 64m°) and the direction of the net moment (e.g., net magnetic moment 62h°) is again in the same inverted direction. The rest of the region N subregions experience the same inversion of their net magnetic moments (e.g., net magnetic moments 62g°, 62i° . . . ). Thus, the subregions of region N all have net magnetic moments aligned in a direction opposite to the alignment direction prior to the heating of the region N to a temperature greater than the compensation temperature. As the opposed moments nucleate a magnetic wall (as at the periphery subregions 66a and 66b upon opposite sides of region N), a stable magnetic domain is created, with diameter D, now storing the new value of the associated data bit.

Referring now to FIGS. 2e-2h, at some later time, a comparison of the data value (e.g., a logic zero) stored in the domain and the logic value (e.g., a logic one) of a new bit of binary data for storage in domain N indicates that the region N must be over-written. This decision enables the write laser diode and causes region N to be again heated, in the absence of any substantial intentional external bias magnetic field, to a temperature in excess of the compensation temperature. The domain wall, as exemplified by wall portions 66a and 66b of FIG. 2e is not abruptly destroyed; there is an inversion of the net magnetic moments 62 of the subregions within region N, due to the reversal of the alloy component magnetic moment dominance. Thus, the net magnetic moments 62f'-62j', of those subregions within the heated region N, are not only modified in amplitude by the Gaussian energy distribution of the impinging light beam, but are also inverted in direction, to point upwardly and away from the magneto-optic material layer. The self-demagnetizing field of the immediately-adjacent subregions (i.e., the upwardly directed net moments of the subregions 62f' and 62j'') cause a reversal in the local magnetic field in the center subregion(s), as here represented by subregion 62h'', of the heated region N, as shown in FIG. 2f, so that at least one of the interior subregions now has the net magnetic moment thereof directed in an again-inverted direction (e.g., the downwardly-directed net magnetic moment 62h'' of a smaller, region of diameter D', less than region/domain diameter D, within the larger domain/region N). A second, inner domain wall, as shown by opposed wall portions 68a and 68b, is now present about the subregion periphery. Local wall motion causes the portions of the inner wall to expand to the locations of the associated portions of the outer wall; the two walls meet and mutually annihilate one another, so that the diameter D'', of the region in which the net magnetic moments 62g''-62i'' (see FIG. 2g) are still inverted, is greater than the domain diameter D'. As the temperature of the region N is decreased to below the compensation temperature, by cooling after cessation of the heating pulse, the relative amplitudes of the RE and TM alloy component magnetic moments change and the subregion net magnetic moments are again all directed in the same direction (e.g., the upward direction for net magnetic moments 62e-62k, of FIG. 2h). The data value stored in region N has, therefore, been inverted (e.g., to a logic one value) from the state of the data value (e.g., the logic zero value) previously stored in that region.

While presently preferred embodiments have been described herein, many modifications and variations should be apparent to those skilled in the art. The scope of the invention is defined in the appended claims and not by the specific details and instrumentalities presented herein as illustrations.

What is claimed is:

1. A magneto-optic information storage system comprising:
   a thin-film magneto-optic recording medium having its net magnetization perpendicular to a plane containing said thin film medium, said medium being formulated to exhibit self-inversion of the direction of net magnetization in at least a portion of a magnetic domain wall bounded region thereof at an elevated temperature above a compensation temperature of the medium and below the Curie temperature of the medium in the absence of an externally applied bias magnetic field;
   irradiating means for temporarily irradiating at least portions of selected regions of the medium with electromagnetic radiation imparting sufficient energy to heat at least said portions from ambient temperature to said elevated temperature whereat the net magnetization of at least said portions is reversed without an externally applied bias magnetic field and whereby, following cooldown to ambient temperature, the net magnetization of at least said portions at ambient temperature is also reversed;
   write means connected to control said irradiating means for temporarily impinging a first pulse of light having a first duration and a first power level upon selected areas of the medium to create magnetic domain wall bounded regions therein and to orient the net magnetization of said regions in a first direction; and
   erase means connected to control said irradiating means for impinging a second pulse of light upon at least portions of selected ones of said regions to re-orient the net magnetization of at least said portions in a second direction opposite to said first direction, said second pulse of light energy having a second duration and second power level, and wherein the energy imparted by said second pulse is less than the energy imparted by said first pulse.

2. The system of claim 1 wherein said medium is ferrimagnetic with a compensation temperature between 40° C. and 140° C. and a Curie temperature at least 50° C. above said compensation temperature.

3. The system of claim 1 wherein said medium is ferrimagnetic with a compensation temperature between 60° C. and 100° C. and a Curie temperature at least 100° C. above said compensation temperature.

4. The system of claim 2 wherein said medium comprises an amorphous alloy including gadolinium, terbium and at least one transition-metal element.

5. The system of claim 2 wherein said alloy contains gadolinium and terbium in approximately equal proportions.

6. The system of claim 1 wherein said first and second power levels are the same, and said second duration is less than said first duration.

7. The system of claim 1 wherein said first and second durations are the same, and said second power level is less than said first power level.

8. A method for direct-overwrite of data by recording domains of reverse magnetic polarity along a track on a magneto-optic recording medium comprising:
   a thin film layer of ferrimagnetic recording medium having a compensation temperature in the range of 40° C. to 140° C. and a curie temperature at least 50° C. above said compensation temperature;
   using a laser movable relative to said recording medium to heat selected data spots along said track above said compensation temperature and below said Curie temperature;
   said laser being energized at a higher energy level sufficient to record a domain without applying any reversible external magnetic bias when a recorded domain is desired; and
   said laser being energized at a lower energy level insufficient to record a new domain but sufficient to erase any previously recorded domains without applying any reversible external magnetic bias where a domain is not desired.

9. The method according to claim 8 wherein said ferrimagnetic recording medium has a compensation temperature in the range of 60° C. to 100° C. and a Curie temperature at least 100° C. above said compensation temperature.

10. The method according to claim 8 wherein said ferrimagnetic medium is an alloy including gadolinium, terbium and at least one transition-metal element.

11. The method according to claim 8 wherein the time required to cool to room temperature after said heating of selected data spots is less than the time between successive heating operations of the same data spot.

12. The method according to claim 8 wherein said laser energizations at said higher energy level and at said lower energy level are at the same power level but at different pulse durations.

13. The method according to claim 8 wherein said laser energizations at said higher energy level and at said lower energy level are at the same pulse duration but at different power levels.

14. A system for direct-overwrite recording on a magneto-optic medium without external magnetic bias comprising:
- a thin film, ferrimagnetic recording medium with uniaxial anisotropy perpendicular to the surface thereof having a compensation temperature at least a few tens of degrees C. above room temperature;
- a laser source for irradiating selective regions of said medium to heat same above said compensation temperature;
- a power circuit for energizing said laser source at a "write" energy level and at a lower energy "erase" level;
- a write control circuit for energizing said laser source via said power circuit at said "write" energy level sufficiently to create a spot domain of reverse magnetic polarity on said medium; and
- an erase control circuit for energizing said laser source via said power circuit at said "erase" energy level when a domain of reverse magnetic polarity is not desired.

15. The system according to claim 14 wherein said recording medium has a compensation temperature in the range of 40° C. to 140° C. and a Curie temperature at least 50° C. above said compensation temperature.

16. The system according to claim 14 wherein said recording medium has a compensation temperature in the range of 60° C. to 100° C. and a Curie temperature at least 100° C. above said compensation temperature.

17. The system according to claim 14 wherein said laser source heats said medium above said compensation temperature but not above said Curie temperature.

18. The system according to claim 14 further including a read control circuit for energizing said laser source via said power source at a power level not sufficient to alter the magnetic state of the recording medium when not energized at either said "write" level or said "erase" level.

19. The system according to claim 14 wherein said ferrimagnetic medium includes gadolinium.

20. The system according to claim 19 wherein said ferrimagnetic medium includes terbium in approximately equal proportion with gadolinium.

21. The system according to claim 14 wherein said "write" and "erase" energy levels are by pulses at the same duration but at different power levels.

22. The system according to claim 14 wherein said "write" and "erase" energy levels are by pulses at the same power level but at different durations.

* * * * *

UNITED STATES PATENT AND TRADEMARK OFFICE
CERTIFICATE OF CORRECTION

PATENT NO. : 4,882,718

DATED : November 21, 1989

INVENTOR(S) : Mark H. Kryder and Han-Ping D. Shieh

It is certified that error appears in the above-identified patent and that said Letters Patent is hereby corrected as shown below:

Column 1, line 31, change "thin" to -- then --;

Column 3, line 27, change "is" to -- can be --; and

Signed and Sealed this

Nineteenth Day of February, 1991

*Attest:*

HARRY F. MANBECK, JR.

*Attesting Officer*      *Commissioner of Patents and Trademarks*